(12) United States Patent
Imai

(10) Patent No.: US 7,416,707 B2
(45) Date of Patent: Aug. 26, 2008

(54) POLYMERIZATION REACTION APPARATUS, AND METHOD OF PRODUCING POLYMER USING THIS APPARATUS

(75) Inventor: Genji Imai, Kanagawa (JP)

(73) Assignee: Kansai Paint Co., Ltd., Amagasaki-shi, Hyogo (JP)

( * ) Notice: Subject to any disclaimer, the term of this patent is extended or adjusted under 35 U.S.C. 154(b) by 486 days.

(21) Appl. No.: 11/131,981

(22) Filed: May 18, 2005

(65) Prior Publication Data

US 2005/0261450 A1 Nov. 24, 2005

(30) Foreign Application Priority Data

May 19, 2004 (JP) ............................. 2004-149053
May 19, 2004 (JP) ............................. 2004-149054

(51) Int. Cl.
*B01J 19/08* (2006.01)
*B01J 19/12* (2006.01)
*C08J 3/28* (2006.01)

(52) U.S. Cl. ...................... 422/186; 422/186.3; 522/79

(58) Field of Classification Search .............. 422/186.3, 422/186; 522/79, 78, 80
See application file for complete search history.

(56) References Cited

U.S. PATENT DOCUMENTS

| | | | | |
|---|---|---|---|---|
| 5,552,502 | A * | 9/1996 | Odell et al. | 526/234 |
| 6,403,672 | B1 * | 6/2002 | Randolph et al. | 522/79 |
| 6,806,332 | B2 * | 10/2004 | Royer et al. | 526/242 |
| 6,914,105 | B1 * | 7/2005 | Charpentier et al. | 526/67 |
| 7,081,486 | B2 * | 7/2006 | Imai et al. | 522/60 |

* cited by examiner

*Primary Examiner*—Susan W Berman
(74) *Attorney, Agent, or Firm*—Knobbe Martens Olson & Bear, LLP

(57) ABSTRACT

A polymerization reaction apparatus is used for producing a polymer by photo-polymerizing a polymerization precursor by irradiation with an active energy ray in a supercritical fluid or subcritical fluid. The apparatus includes a reaction vessel (3), active energy ray irradiation means (6, 5), a fluid feeding means of feeding a fluid into the reaction vessel, and a fluid discharging means of discharging the fluid. The apparatus further includes [1] polymerization precursor storage parts (11, 11') for accommodating a polymerization precursor and/or addition components to be contained in the polymer and feeding the polymerization precursor and/or addition components to a reaction field, or [2] a polymerization precursor feeding means capable of feeding a polymerization precursor and/or addition components into the reaction vessel.

21 Claims, 2 Drawing Sheets

Prior Art

POLYMERIZATION REACTION APPARATUS, AND METHOD OF PRODUCING POLYMER USING THIS APPARATUS

BACKGROUND OF THE INVENTION

1. Field of the Invention

The present inventions relates to a polymerization reaction apparatus. More particularly, the present invention relates to a polymerization reaction apparatus used for producing a polymer by photo-polymerizing a polymerization precursor such as a monomer in a supercritical fluid or subcritical fluid.

Further, the present invention relates to a method of producing a polymer using this polymerization reaction apparatus.

2. Description of the Prior Art

A supercritical fluid is a fluid having a density near that of liquid and having a viscosity and diffusion coefficient near those of gas, and has a diffusion property of gas and substance dissolving property of liquid in combination, therefore, it has various effects as a reaction solvent.

Recently, there are trials for producing a polymer using a supercritical fluid, particularly, supercritical carbon dioxide, as a solvent. When supercritical carbon dioxide is used as a solvent, there is no necessity for drying and removal of a solvent after polymerization, resultantly, a process can be simplified and cost can be decreased, as compared with a solution polymerization method using an organic solvent, and the like. From the standpoint of no use of an organic solvent, load in atmospheric aspect is also small. However, carbon dioxide can be recovered and recycled easily as compared with organic solvents. Further, in many cases, since a polymer and a monomer show a difference in the degree of dissolution for carbon dioxide, the amount of unreacted monomers contained in a product polymer decreases and a polymer of higher purity can be produced, by using supercritical carbon dioxide as a solvent.

Regarding the method of producing a polymer using a supercritical fluid, for example, WO 93/20116, Japanese Patent Application Laid-Open (JP-A) Nos. 2000-26509, 2002-327003, 2001-151802, 2002-179707 and 2002-128808 disclose methods of producing a polymer in which a monomer is thermally polymerized in a supercritical fluid such as supercritical carbon dioxide. However, a method of producing a polymer in which a monomer is photo-polymerized in a supercritical fluid is not known.

On the other hand, as an apparatus used in a reaction using a supercritical fluid, Yasuhiko Arai, ed., "CHORIN-KAIRYUTAI NO SUBETE", Techno System K.K., p. 586 describes an example of a circulation mode supercritical water reaction apparatus. The above-mentioned literature describes also an example of a supercritical $CO_2$ fluid extraction apparatus with window. Conventional supercritical reaction apparatuses (supercritical fluid reaction apparatus) are all the same as the apparatus described in the above-mentioned literature.

Recently, from the standpoint of higher function and multi-function, the composition of a polymer membrane or a polymer containing a projection portion such as a polymer brush is varied, for example, along the membrane thickness direction (vertical direction against base material surface). For example, JP-A No. 2002-145971 discloses a nano structure functional body in which a graft polymer chain constituting a graft polymer layer disposed on the surface of a substrate by graft polymerization is copolymerized with a different monomer or oligomer to form a multi-layer structure containing chemical compositions varying along the membrane thickness direction.

A schematic constitution view of one example of conventional supercritical reaction action apparatuses used in photo-reaction is shown in FIG. 4. 1 represents a carbon dioxide bomb, 2 represents carbon dioxide feeding pump, 3 represents a reaction vessel capable of maintaining high temperature and high pressure conditions, 4 represents a temperature controlling means, 5 represents a window for incidence of an active energy ray (for example, quartz window), 5' represents a window (for example, quartz window), 6 represents a light source, 7 represents a back pressure regulating valve, 9 represents a magnetic stirrer, and 10 represents a stirrer (rotor).

In the case of photo-reaction using the supercritical reaction apparatus shown in FIG. 4, first, a reaction substance (polymer precursor such as a monomer in the case of polymerization reaction) is placed in a reaction vessel 3. Next, carbon dioxide is fed from a carbon dioxide bomb 1 to the reaction vessel 3 by a pump 2. Pressure in the reaction vessel 3 is controlled by the amount of carbon dioxide to be fed, temperature in the reaction vessel 3 is controlled by a temperature controlling means 4 such as a heater, to convert carbon dioxide in the reaction vessel 3 into supercritical or subcritical condition. A photo-reaction is conducted by irradiating the inside of the reaction vessel 3 with an active energy ray through an active energy ray transmissible window 5 from a light source 6 while stirring the inside of the reaction vessel 3 by a magnetic stirrer 9 and a stirrer 10.

In the case of production of a polymer membrane or a polymer containing a projection portion such as a polymer brush, variation of the composition of a polymer to be produced along the membrane thickness direction is possible by changing the composition of a polymerization precursor to be polymerized and/or addition components to be contained in the polymer, during polymerization. It is also possible to produce polymer fine particles having a gradient composition by changing the composition of a polymerization precursor to be polymerized and/or addition components to be contained in the polymer, during polymerization. However, in the conventional supercritical reaction apparatus as shown in FIG. 4, it is not necessarily easy to change the composition of a polymerization precursor to be polymerized and/or addition components to be contained in the polymer, during polymerization.

SUMMARY OF THE INVENTION

An object of the present invention is to provides a polymerization reaction apparatus used for producing a polymer by photo-polymerizing a polymerization precursor such as a monomer in a supercritical fluid or subcritical fluid, wherein the composition of a polymerization precursor to be polymerized and/or addition components to be contained in the polymer can be easily changed during polymerization, and resultantly, a polymer membrane or a polymer containing a projection portion in which the composition varies along the membrane thickness direction or along the vertical direction against the base material surface can be simply produced.

A first present invention relates to a polymerization reaction apparatus used for producing a polymer by photo-polymerizing at least one polymerization precursor by irradiation with an active energy ray in a supercritical fluid or subcritical fluid, wherein the apparatus has a reaction vessel allowing photo-polymerization of said polymerization precursor and capable of maintaining a fluid under supercritical condition or under subcritical condition, an active energy ray irradiation means of irradiating the inside of said reaction vessel with said active energy ray, a fluid feeding means of feeding said fluid into said reaction vessel, and a fluid discharging means of discharging said fluid in said reaction vessel, the apparatus is equipped with at least one polymerization precursor storage part for accommodating a polymerization precursor to be polymerized and/or one or more addition components to be contained in the polymer, and said polymerization precursor storage part has a structure capable of feeding a polymerization precursor and/or addition components stored inside to a reaction field; and furthermore, to a method of producing a polymer wherein at least one polymerization precursor is photo-polymerized by irradiation with an active energy ray in a supercritical fluid or subcritical fluid using this polymerization reaction apparatus to produce a polymer.

In the first present invention, when a photo-polymerization reaction is conducted using the polymerization reaction apparatus of the present invention, a polymerization precursor to be polymerized and addition components are not all placed in a reaction vessel as a reaction field at initiation of polymerization, but at least a part thereof is placed in a polymerization precursor storage part. During polymerization, if necessary, the polymerization precursor and/or addition components stored in the polymerization precursor storage part are fed to the reaction vessel.

A second present invention relates to a polymerization reaction apparatus used for producing a polymer by photo-polymerizing at least one polymerization precursor by irradiation with an active energy ray in a supercritical fluid or subcritical fluid, wherein the apparatus has a reaction vessel allowing photo-polymerization of said polymerization precursor and capable of maintaining a fluid under supercritical condition or under subcritical condition, an active energy ray irradiation means of irradiating the inside of said reaction vessel with said active energy ray, a fluid feeding means of feeding said fluid into said reaction vessel, and a fluid discharging means of discharging said fluid in said reaction vessel, and the apparatus has at least one polymerization precursor feeding means having a structure capable of feeding a polymerization precursor to be polymerized and/or addition components to be contained in the polymer into said reaction vessel; and furthermore, to a method of producing a polymer wherein at least one polymerization precursor is photo-polymerized by irradiation with an active energy ray in a supercritical fluid or subcritical fluid using this polymerization reaction apparatus to produce a polymer.

In the second present invention, the polymerization precursor feeding means is provided out of the reaction vessel, and for example, has a polymerization precursor storage part for accommodating a polymerization precursor and/or one or more addition components, a polymerization precursor storage part fluid feeding means of feeding a fluid into the polymerization precursor storage part, and a polymerization precursor-fluid feeding means of feeding the polymerization precursor and/or addition components stored in the polymerization precursor storage part together with the fluid into the reaction vessel.

When a photo-polymerization reaction is conducted using the polymerization reaction apparatus according to the second present invention, for example, a polymerization precursor to be polymerized and addition components are not all placed in a reaction vessel, at initiation of polymerization, but at least a part thereof is placed in a polymerization precursor storage part. During polymerization, if necessary, the polymerization precursor and/or addition components stored in the polymerization precursor storage part are dissolved and/or dispersed in a fluid and fed under this condition to the reaction vessel. The polymerization precursor and/or addition components are, usually, dissolved and/or dispersed in a fluid in the polymerization precursor storage part, then, fed to the reaction vessel.

In the first and second present inventions, the active energy ray irradiation means has, for example, a light source of an active energy ray provided outside of the reaction vessel, and a window part provided on part of the above-mentioned reaction vessel and capable of allowing transmission of an active energy ray radiated from the above-mentioned light source for irradiation into the above-mentioned reaction vessel.

The supercritical fluid means a fluid under conditions in which both temperature and pressure are over critical points, namely, conditions of over critical temperature and over critical pressure. The critical temperature and critical pressure are values specific to a substance. For example, carbon dioxide has a critical temperature of 30.9° C. and a critical pressure of 7.38 Mpa. Methanol has a critical temperature of 239.4° C. and a critical pressure of 8.09 Mpa. Water has a critical temperature of 374.1° C. and a critical pressure of 22.12 Mpa. The subcritical fluid is a fluid manifesting the same action and effect as the supercritical fluid, and usually, has a temperature 0.65-fold or more of the critical temperature in terms of Kelvin unit and a pressure 0.65-fold or more of the critical pressure.

The photo-polymerization referred to in the present invention includes also photo-hardening and photo-crosslinking.

When a polymer is produced using the polymerization reaction apparatus of the present invention, feeding of a polymerization precursor and/or addition components into a reaction field or reaction vessel is not limited to during polymerization reaction. For example, it is also possible to feed a polymerization precursor and/or addition components stored in a polymerization precursor storage part to a reaction field before initiation of polymerization. Further, for example, it is also possible to feed a polymerization precursor and/or addition components into a reaction vessel by a polymerization precursor feeding means before initiation of polymerization.

According to the present inventions, the composition and amount of a polymerization precursor and addition components present in a reaction vessel can be easily changed during polymerization. As a result, by use of the polymerization reaction apparatus of the present inventions, a polymer membrane or a polymer containing a projection portion can be simply produced, for example, having a composition varying along the membrane thickness direction or the vertical direction against the base material surface.

Here, "polymer containing a projection portion" means a polymer in the form of projection, or a polymer having one or more projections. In the case of a polymer in the form of projection, the polymer itself is called "projection portion", and in the case of a polymer having one or more projections, the projections are called "projection portion". The "polymer containing a projection portion" includes, but not limited to, so-called polymer brushes.

DETAILED DESCRIPTION OF THE PREFERRED EMBODIMENTS

Figure 1:
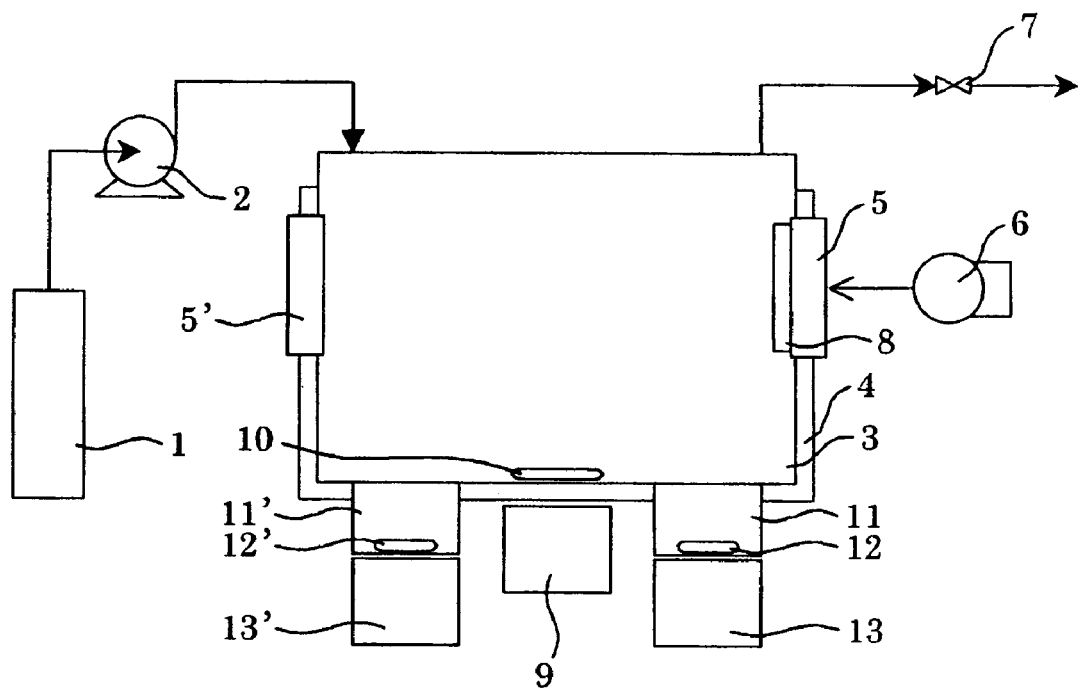
FIG. 1 is a schematic constitution view of one example of the polymerization reaction apparatus according to the first present invention.

FIG. 1 shows a schematic constitution view of one example of the polymerization reaction apparatus according to the first present invention. 1 represents a carbon dioxide bomb, 2 represents carbon dioxide feeding pump, 3 represents a reaction vessel capable of maintaining high temperature and high pressure conditions, 4 represents a temperature controlling means, 5 represents a window for incidence of an active energy ray (for example, quartz window), 5' represents a window (for example, quartz window), 6 represents a light source, 7 represents a back pressure regulating valve, 8 represents a base material allowing transmission of an active energy ray (active energy ray transmission base material), 9 represents a magnetic stirrer, 10 represents a stirrer (rotor), 11 and 11' represent a polymerization precursor storage part equipped with an openable and closable lid for accommodating a polymerization precursor to be polymerized and/or one or more addition components to be contained in the polymer, 12 and 12' represent a stirrer (rotor), and 13 and 13' represent a magnetic stirrer.

Figure 4:
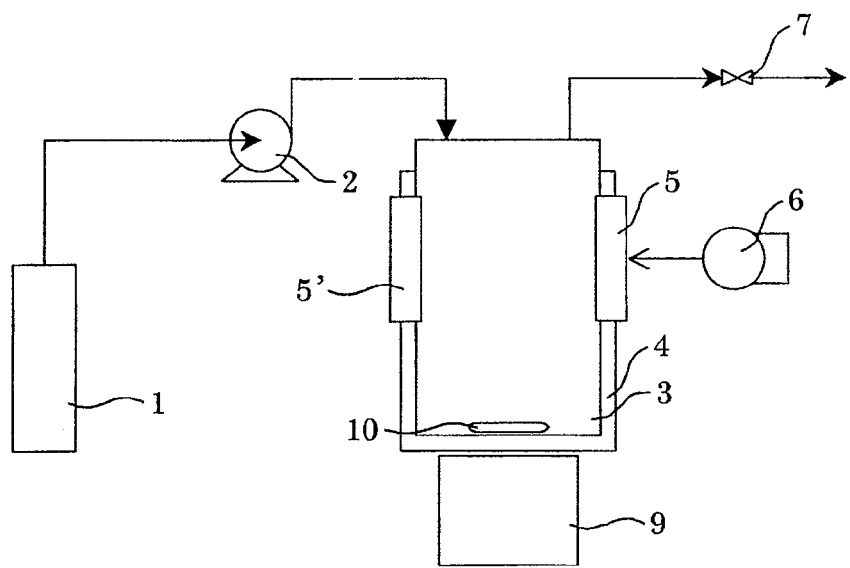
FIG. 4 is a schematic constitution view of one example of conventional supercritical reaction apparatuses used in photo-reaction.

The polymerization reaction apparatus shown in FIG. 1 has the same constitution as that of the conventional reaction apparatus shown in FIG. 4 except that polymerization precursor storage parts 11 and 11' equipped with an openable and closable lid for accommodating one or more polymerization precursors and/or addition components are provided and that stirrers 12 and 12' for stirring the inside of the polymerization precursor storage parts 11 and 11' and magnetic stirrers 13 and 13' are provided.

In the polymerization reaction apparatus shown in FIG. 1, the polymerization precursor storage parts 11 and 11' for accommodating one or more polymerization precursors and/or addition components are a concave part provided at the bottom of the reaction vessel 3, and on this is provided an openable and closable lid. The polymerization reaction apparatus shown in FIG. 1 is so constituted that before initiation of polymerization or during polymerization, if necessary, the lids of the polymerization precursor storage parts 11 and 11' are opened, and polymerization preprecursors and/or addition components stored inside are fed to the reaction vessel 3.

The lid of the polymerization precursor storage parts 11 and 11' can be opened and closed by, for example, a means as described below.

Figure 2:
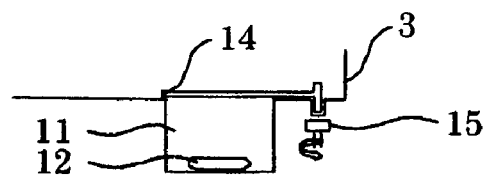
FIG. 2 is a schematic constitution view of one example of an openable and closable lid on a polymerization precursor storage part in the polymerization reaction apparatus according to the first present invention.

FIG. 2 is a schematic constitution view of one example of an openable and closable lid on a polymerization precursor storage part. 3 represents a reaction vessel, 11 represents a polymerization precursor storage part, 12 represents a stirrer (rotor), 14 represents a lid of the polymerization precursor storage part, and 15 represents a magnet. When the magnet 15 outside of the reaction vessel 3 is rotated, the lid 14 rotates toward the same direction as that of the magnet 15 in conjunction. By this, the lid 14 of the polymerization precursor storage part 11 can be opened and closed. This lid 14 has a structure by which it can be opened and closed by magnetic force of the magnet 15 from outside of the reaction vessel 3, however, the means of opening and closing the lid of the polymerization precursor storage part is not limited to the above-mentioned means.

The polymerization reaction apparatus shown in FIG. 1 may further have a polymerization precursor storage part temperature controlling means for controlling the temperature of the polymerization precursor storage parts 11 and 11' such as a heater.

The polymerization precursor storage part stirring means for stirring the inside of the polymerization precursor storage parts 11 and 11' is not limited to the magnetic stirrers 13, 13' and stirrers 12, 12'.

When a polymerization precursor and/or addition components stored in the polymerization precursor storage parts 11 and 11' can be fed into the reaction vessel 3 sufficiently quickly and the like, the polymerization precursor storage part stirring means may not exist.

The polymerization precursor storage parts 11 and 11' may not have a lid providing they have a constitution in which a polymerization precursor and/or addition components stored inside can be fed to a reaction system (reaction vessel) only when required. For example, when a polymerization precursor and/or addition components are not dissolved or dispersed in a supercritical fluid or subcritical fluid unless temperature is raised, it may be permissible that a lid is not provided on a polymerization precursor storage part and a heating means for heating a polymerization precursor storage part (polymerization precursor storage part temperature controlling means) is provided.

The polymerization reaction apparatus of the present inventions may have, according to demands, only one polymerization precursor storage part or three or more polymerization precursor storage parts. The polymerization precursor storage part is not limited to that having a form shown in FIG. 1, namely, it may not be a concave part provided at the bottom of the reaction vessel.

Figure 3:
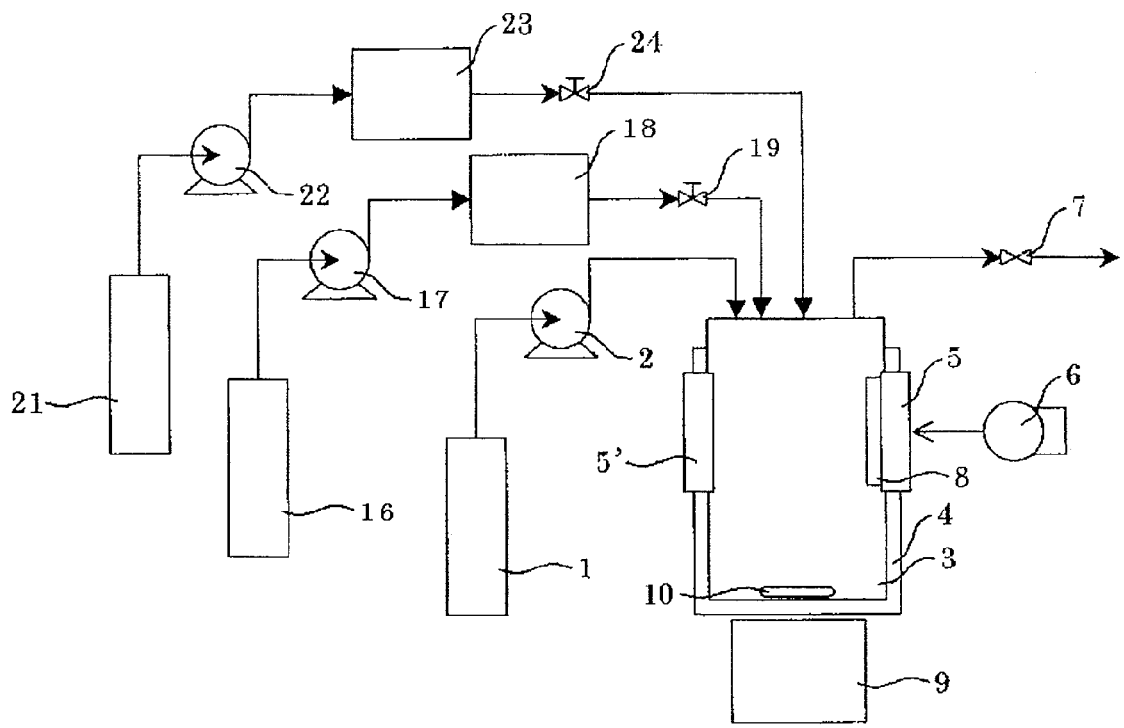
FIG. 3 is a schematic constitution view of one example of the polymerization reaction apparatus according to the second present invention.

FIG. 3 shows a schematic constitution view of one example of the polymerization reaction apparatus according to the second present invention. 1 to 10 have the same meanings as in FIG. 1. 16 represents a carbon dioxide bomb, 17 represents a carbon dioxide feeding pump, 18 represents a polymerization precursor storage part for accommodating a polymerization precursor to be polymerized and/or one or more addition components to be contained in the polymer, 19 represents a stop valve, 21 represents a carbon dioxide bomb, 22 represents a carbon dioxide feeding pump, 23 represents a polymerization precursor storage part for accommodating a polymerization precursor to be polymerized and/or one or more addition components to be contained in the polymer, and 24 represents a stop valve. The polymerization reaction apparatus shown in FIG. 3 has, though not shown, a stirring means (stirrer and magnetic stirrer) for stirring the inside of the polymerization precursor storage part 18 and a stirring means (stirrer and magnetic stirrer) for stirring the inside of the polymerization precursor storage part 23, and further, has a temperature controlling means (heater) for controlling the temperature in the polymerization precursor storage part 18 and a temperature controlling means (heater) for controlling the temperature in the polymerization precursor storage part 23. The polymerization reaction apparatus shown in FIG. 3 also has, though not shown, a temperature controlling means (heater) for controlling the temperature of a line (piping) from the polymerization precursor storage part 18 to the reaction vessel 3 and a line (piping) from the polymerization precursor storage part 23 to the reaction vessel 3.

The polymerization reaction apparatus shown in FIG. 3 has the same constitution as that of the conventional reaction apparatus shown in FIG. 4 except that a polymerization precursor feeding means containing the polymerization precursor storage part 18 for accommodating one or more polymerization precursors and/or addition components, and a polymerization precursor feeding means containing the polymerization precursor storage part 23 for accommodating one or more polymerization precursors and/or addition components, are provided.

The polymerization reaction apparatus shown in FIG. 3 is so constituted that a fluid carbon dioxide is fed from the carbon dioxide bomb 16 to the polymerization precursor storage part 18 by the pump 17, and in the polymerization precursor storage part 18, polymerization precursors and/or addition components stored in the polymerization precursor storage part 18 are dissolved and/or dispersed in carbon dioxide, then, before initiation of polymerization or during polymerization, if necessary, the stop valve 19 is opened, and the polymerization precursors and/or addition components stored in the polymerization precursor storage part 18 are, together with a fluid carbon dioxide, fed into the reaction vessel 3. Further, the polymerization reaction apparatus shown in FIG. 3 is so constituted that a fluid carbon dioxide is fed from the carbon dioxide bomb 21 to the polymerization precursor storage part 23 by the pump 22, and in the polymerization precursor storage part 23, polymerization precursors and/or addition components stored in the polymerization precursor storage part 23 are dissolved and/or dispersed in carbon dioxide, then, before initiation of polymerization or during polymerization, if necessary, the stop valve 24 is opened, and the polymerization precursors and/or addition components stored in the polymerization precursor storage part 23 are, together with a fluid carbon dioxide, fed into the reaction vessel 3.

The polymerization precursor feeding means may have a polymerization precursor feeding speed controlling means for controlling the speed of feeding of polymerization precursors and/or addition components into the reaction vessel 3, and for example, when the polymerization precursors and/or addition components stored in the polymerization precursor storage parts 18, 23 are all fed into the reaction vessel 3 during discontinuance of the reaction, the polymerization precursor feeding speed controlling means may not exist.

The polymerization precursor storage part temperature controlling means for controlling the temperature of the polymerization precursor storage parts 18, 23 is not limited to a heater (not shown).

For example, when the polymerization precursors and/or addition components stored in the polymerization precursor storage parts 18, 23 can be dissolved and/or dispersed sufficiently uniformly in a fluid and fed to the reaction vessel 3 under this condition, and the like, the polymerization precursor storage part temperature controlling means may not exist.

The temperature controlling means for controlling the temperature of a line (piping) from the polymerization precursor storage part 18 to the reaction vessel 3 and a line (piping) from the polymerization precursor storage part 23 to the reaction vessel 3 is not limited to a heater (not shown). When not required, such a temperature controlling means may not exist.

The polymerization precursor storage part stirring means for stirring the inside of the polymerization precursor storage parts 18, 23 is not limited to a magnetic stirrer or stirrer (not shown). As the polymerization precursor storage part stirring means, known stirring machines can be used.

For example, when the polymerization precursors and/or addition components stored in the polymerization precursor storage parts 18, 23 can be dissolved and/or dispersed sufficiently uniformly in a fluid and fed to the reaction vessel 3 under this condition, and the like, the polymerization precursor storage part stirring means may not exist.

The polymerization precursor feeding means feeds polymerization precursors and/or addition components dissolved and/or dispersed in a fluid into a reaction vessel, and in this procedure, the fluid may not be a supercritical fluid or subcritical fluid.

The polymerization precursor feeding means is not limited to that described above providing it has a constitution in which polymerization precursors and/or addition components stored in a polymerization precursor storage part can be dissolved and/or dispersed in a fluid and fed to a reaction system (reaction vessel) under this condition only when required.

In the polymerization reaction apparatus of the present inventions, the constitution and form of the polymerization precursor feeding means are not limited to those shown in FIG. 3. The polymerization reaction apparatus of the present inventions may have, according to demands, only one polymerization precursor feeding means or three or more polymerization precursor feeding means. Further, two or more polymerization precursor storage parts may be provided on one polymerization precursor feeding means.

In the polymerization reaction apparatuses shown in FIGS. 1 and 3, the active energy ray irradiation means for irradiating the inside of a reaction vessel with an active energy ray is constituted of the light source 6 and the window 5 for incidence of an active energy ray. The window is not limited to a quartz window, and may be that allowing transmission of an active energy ray.

The active energy ray irradiation means is not limited to that described above, and for example, it may also be possible that an optical system such as a fiber is inserted in a reaction vessel and the inside of the reaction vessel is irradiated with an active energy ray though this optical system.

The active energy ray irradiation region in the reaction vessel may not always be the same region. For example, in the active energy ray irradiation means constituted of the light source 6 and the window 5 for incidence of an active energy ray, it may also be permissible that the light source 6 is not fixed and the light source 6 moves during polymerization.

In the polymerization reaction apparatuses shown in FIGS. 1 and 3, though the window 5 for incidence of an active energy ray is essential, a window 5' for observation may not be provided.

In the polymerization reaction apparatuses shown in FIGS. 1 and 3, the temperature controlling means 4 for controlling the temperature in a reaction vessel is provided. When the temperature in the reaction vessel 3 can be kept at the polymerization temperature during polymerization such as the case of feeding into the reaction vessel 3 of carbon dioxide and polymerization precursor and addition components controlled at the polymerization temperature or higher temperatures previously by a heating means, the temperature controlling means 4 such as a heating means may not exist.

The stirring means for stirring the inside of the reaction vessel 3 is not limited to a magnetic stirred 9 or stirrer 10. As the stirring means, known stirring machines can be used. When polymerization precursors and addition components can be uniformly dissolved or dispersed in a supercritical fluid or subcritical fluid in the reaction vessel 3 as a reaction field even without stirring means, a stirring means for stirring the inside of a reaction vessel may not exist.

In the polymerization reaction apparatuses shown in FIGS. 1 and 3, a base material disposing means (not shown) is further provided for disposing an active energy ray transmission base material 8 forming a polymer membrane or a polymer containing a projection portion so that the incidence surface of an active energy ray is not exposed to a supercritical fluid or subcritical fluid and the exiting surface of an active energy ray is exposed to a supercritical fluid or subcritical fluid.

The base material disposing means may be that capable of fixing a base material, and is not particularly restricted. As the base material disposing means, for example, fasteners for installing a base material on a window frame, and the like, are mentioned.

The base material disposing means may not particularly be provided providing a base material can be fixed. For example, when a window is provided at the bottom of a concave part of a reaction vessel wall and a base material can be pushed therein to be closely adhered to the window, the base material disposing means may not exist. It is also possible that a window is removable and the widow itself is utilized as a base material.

Also when a polymer membrane or a polymer containing a projection portion is not formed on a base material, the base material disposing means may not exist.

The polymerization reaction apparatus of the present inventions may also have a structure capable of moving an active energy ray transmission base material forming a polymer membrane or a polymer containing a projection portion. By such a constitution, the active energy ray irradiation region and the active energy ray exiting region of the base material can be changed, and for example, it also becomes possible to form a polymer membrane or a polymer containing a projection portion on the whole surface of the base material.

The polymerization reaction apparatus of the present inventions may have two or more base material disposing means or may have a base material disposing means capable of disposing two or more base material. The base material disposing means can be of turret mode, for example, turret mode in which rotation is caused by magnetic force from outside of the reaction vessel 3.

The polymerization reaction apparatus of the present inventions can have a constitution in which carbon dioxide discharged from the reaction vessel 3 after completion of polymerization reaction is recovered and recycled.

In the polymerization reaction apparatus of the present inventions, the form of the reaction vessel is also not limited to those shown in FIGS. 1 and 3.

Though the polymerization reaction apparatuses shown in FIGS. 1 and 3 have a constitution using supercritical carbon dioxide or subcritical carbon dioxide as a supercritical fluid or subcritical fluid, the supercritical fluid or subcritical fluid used is not limited to carbon dioxide.

The supercritical fluid or subcritical fluid used can be appropriately selected depending on the degree of dissolution of a polymerization precursor, and the like. Examples of the supercritical fluid or subcritical fluid include water, methane, ethane, ethylene, propane, propylene, alcohols such as methanol, ammonia, fron and carbon monoxide, in addition to carbon dioxide, and further, inorganic gases such as nitrogen, helium and argon are mentioned. These supercritical fluids or subcritical fluids can also be a mixture of two or more.

Particularly, the polymerization reaction apparatus shown in FIG. 3 has a constitution in which carbon dioxide is used as a fluid used in feeding into the reaction vessel 3 of polymerization precursors and/or addition components stored in the polymerization precursor storage parts 18, 23, however, the fluid used is not limited to carbon dioxide. The fluid used in feeding into the reaction vessel 3 of polymerization precursors and/or addition components stored in the polymerization precursor storage parts 18, 23 is preferably the same as the supercritical fluid or subcritical fluid as a polymerization solvent in usual, however, it may also be permissible that the fluid used is different from the supercritical fluid or subcritical fluid as a polymerization solvent and the composition of a polymerization solvent is varied from initiation of polymerization.

The active energy ray used in a polymerization reaction apparatus of the present inventions can be appropriately determined depending on polymerization precursors and photo-polymerization initiators to be polymerized. The active energy ray include ultraviolet ray having a wavelength of 10 to 380 nm, visible ray having a wavelength of 380 to 780 nm, near-infrared ray having a wavelength of 780 nm (0.78 µm) to 2.5 µm, and the like. In may cases, as the active energy ray, there are used ultraviolet ray or visible ray having a wavelength of 500 nm or less, further, ultraviolet ray or visible ray having a wavelength of 420 nm or less, particularly, ultraviolet ray having a wavelength of 380 nm or less, further, ultraviolet ray having a wavelength of 330 nm or less.

The active energy ray used for irradiation may not be that having a single wavelength or that having one peak in spectral distribution (light emission distribution), and those having any spectral distribution may be permissible providing light of the above-mentioned wavelength is included.

As lamps (light source) used for irradiation with an active energy ray, those generally used can be used, and examples thereof include an extra high pressure mercury lamp, high pressure mercury lamp, middle pressure mercury lamp, low pressure mercury lamp, chemical lamp, metal halide lamp, carbon arc lamp, xenon lamp, mercury-xenon lamp, tungsten lamp, hydrogen lamp, heavy hydrogen lamp, excimer lamp, short arc lamp and, laser having an oscillation line in UV laser (wavelength: 351 nm to 364 nm), and helium-cadmium laser, argon laser and excimer laser.

Next, one example of a method of producing a polymer in which at least one polymerization precursor is photo-polymerized using the polymerization reaction apparatus of the present inventions shown in FIGS. 1 and 3 (method of producing a polymer of the present inventions) will be illustrated.

First, the active energy ray transmission base material 8 is disposed inside of the active energy ray transmissible window 5 provided on the reaction vessel 3, and fixed to the base material disposing means. The active energy ray transmission base material 8 is so disposed that a surface on the side of the window 5 as an incidence surface of an active energy ray is not exposed to supercritical carbon dioxide or subcritical carbon dioxide and an exiting surface of an active energy ray is exposed to supercritical carbon dioxide or subcritical carbon dioxide. The active energy ray transmission base material 8 may not be disposed so as to contact the window 5, and a disposing member such as an active energy ray transmission film or the like can also intervene.

The base material is not particularly restricted providing it allows transmission of an active energy ray, and examples thereof include transparent resins or semi-transparent resins, transparent or semi-transparent glass, metal oxides such as ITO (indium-tin oxide), and metals. For example, base materials coated with a coating material such as polyvinyl alcohol (PVA) can also be used. The quality of the base material is selected in view of the composition of a polymer to be formed, and the like. The material in any form can be used.

The form of the window 5 for incidence of an active energy ray on which the base material is disposed or a disposing member provided thereon can be determined in accordance with the form of a base material for forming a polymer membrane or a polymer containing a projection portion or the form of a desired polymer membrane or a polymer containing a projection portion.

When the polymerization reaction apparatus of the present inventions shown in FIG. 1 is used, the active energy ray transmission base material 8 is disposed in the reaction vessel 3, then, a polymerization precursor and, if necessary, addition components, are placed in the reaction vessel 3. If necessary, a polymerization initiator is also placed in the reaction vessel 3. In this case, part of the polymerization precursor and addition components are placed in the polymerization precursor storage parts 11 and 11'. Into the polymerization precursor storage parts 11 and 11', one polymerization precursor or addition component may be placed, or two or more polymerization precursors and/or addition components may be placed. Polymerization precursors and/or addition components to be placed in the reaction vessel 3, polymerization precursor storage parts 11 and 11' can be appropriately selected depending on the composition of a desired polymer (gradient composition).

When the polymerization reaction apparatus of the present inventions shown in FIG. 3 is used, the active energy ray transmission base material 8 is disposed in the reaction vessel 3, then, a polymerization precursor and if necessary, addition components, are placed in the reaction vessel 3. If necessary, a photo-polymerization initiator is also placed in the reaction vessel 3. Further, part of the polymerization precursors and addition components are placed in the polymerization precursor storage part 18 and the polymerization precursor storage part 23 of the polymerization precursor feeding means. Into the polymerization precursor storage part 18 and the polymerization precursor storage part 23, one polymerization precursor or addition component may be placed or two or more polymerization precursors and/or addition components may be mixed and placed. The polymerization precursors and/or addition components to be placed in the reaction vessel 3, the polymerization precursor storage part 18 and the polymerization precursor storage part 23 can be appropriately selected depending on the composition (gradient composition) of a desired polymer.

When the polymerization precursor and addition components are in the form of liquid, a polymerization precursor and addition components and if necessary a photo-polymerization initiator can also be fed from their storage baths to the reaction vessel 3 by pumps. The polymerization precursor and addition components can also be mixed previously before feeding to the reaction vessel 3, alternatively, they can be separately fed to the reaction vessel 3. The polymerization precursor and addition components and photo-polymerization initiator can also be controlled at the polymerization temperature previously by a heating apparatus before feeding to the reaction vessel 3.

The charging concentrations of the polymerization precursor and addition components can be determined appropriately depending on the polymerization precursor to be polymerized and reaction conditions and the like. For example, the charging concentrations of the polymerization precursor can be from 1 wt % to 70 wt %.

The polymerization precursor used in the present inventions is not particularly restricted providing it is dissolved in a supercritical fluid or subcritical fluid as a solvent and it has photo-polymerizability. The polymerization precursor can also be polymerized under condition of partial dissolution thereof in a supercritical fluid or subcritical fluid. The polymerization precursor may be a monomer, oligomer or polymer. As the polymerization precursor, it is preferable to use a photo-hardening compound which is a compound having two or more unsaturated bonds. As the polymerization precursor, a polymerization precursor having one unsaturated bond can also be used together with a photo-hardening compound.

As the polymerization precursor, mentioned are compounds having one or more structures selected from the group consisting of a maleimide group optionally having a substituent, (meth)acryloyl group optionally having a substituent, cyclic ether structure optionally having a substituent, alkenyl group optionally having a substituent, vinylene group optionally having a substituent, styryl group optionally having a substituent and azide group. Here, the (meth)acryloyl group means an acryloyl group or methacryloyl group. When two or more of these groups are contained, only the same group may be contained, or different groups may be contained. The substituent is not particularly restricted providing it does not disturb polymerization reaction, and examples thereof include a hydrocarbon group having 12 or less carbon atoms, halogen atom, amino group, carboxyl group, hydroxyl group and cyano group. The polymerization precursor may be used singly or in combination of two or more.

The addition components used in the present inventions are not particularly restricted, and may be an organic substance or an inorganic substance. The addition components can be appropriately selected depending on the composition and physical properties of a desired polymer, and the like. It is preferable that the addition components are subjected to photo-polymerization under condition of at least partial dissolution thereof in a supercritical fluid or subcritical fluid, and it is also possible to conduct photo-polymerization under condition of dispersion into a supercritical fluid or subcritical fluid.

As the addition component, for example, mentioned are compounds containing one or more metals such as Ni, Au, Ag, Cu, In, Pd, Pt, Sn, W and Al (including also complex). The addition components include various medically beneficial components and, other resin components, rubber components, fillers, heat resistant stabilizers, weather resistant stabilizers, antioxidants, antistatic agents, flame retardants, slipping agents, anti-blocking agents, anti-fogging agents, lubricants, nucleating agents, dyes, pigments and the like. The addition components may be used singly or in combination of two or more.

The use amount of the addition components can be appropriately determined depending on the composition and physical properties of a desired polymer, and the like, and for example, it can be about 0.001 to 100 parts by weight per 100 parts by weight of a polymerization precursor to be polymerized.

In the case of polymerization of polymerization precursors other than spontaneous photo-polymerizable compounds as a compound which is photo-polymerized in the absence of a photo-polymerization initiator, a photo-polymerization initiator is necessary. The photo-polymerization initiator is not particularly restricted providing it is dissolved in a supercritical fluid or subcritical fluid or a polymerization precursor, and can be appropriately determined depending on the supercritical fluid or subcritical fluid or polymerization precursor used and the like.

Examples of the photo-polymerization initiator include azo-based initiators such as dialkyl(2,2'-azobisisobutyrate) such as dimethyl(2,2'-azobisisobutyrate) and diethyl(2,2'-azobisisobutyrate), and 2,2'-azobis(isobutyronitrile) (AIBN), 2,2'-azobis-(2-methylbutyronitrile) and 2,2'-azobis(2,4-dimethylvaleronitrile); peroxide-based initiators such as tert-butyl hydroperoxide, cumene hydroperoxide, tert-butyl peroxy neodecanate, tert-butyl peroxy pivalate, tert-hexyl peroxy-2-ethyl hexanoate, methyl ethyl ketone peroxide, acetylcyclohexylsulfonyl peroxide, lauroyl peroxide and benzoyl peroxide. The photo-polymerization initiators may be used singly or in combination of two or more.

The used amount of the photo-polymerization initiator can be determined appropriately, and for example, it can be about 0.1 to 30 parts by weight per 100 parts by weight of a polymerization precursor.

If necessary, a photo-polymerization initiator and a photo-polymerization initiation aid (sensitizer) can be used in combination. Examples of the photo-polymerization initiation aid include 2-dimethylaminoethyl benzoate, N,N'-dimethylamino-ethyl methacrylate, isoamyl p-dimethylaminobenzoate and ethyl p-dimethylamino-benzoate.

It is also possible to use a spectral sensitizer showing mutual action with a polymer to be produced or a photo-polymerization initiator. Examples of the spectral sensitizer include thioxanthene, xanthene, ketone, thiopyrylium salt, base styryl, merocyanine, 3-substitued coumarin, cyanine, and, acridine and thiazine-based dyes. "Mutual action" herein referred to include energy transfer or electron transfer from a spectral sensitizer excited to a polymer to be produced and/or a photo-polymerization initiator, and the like.

On the other hand, carbon dioxide is fed from the carbon dioxide bomb 1 to the reaction vessel 3 by the pump 2. It is also possible that carbon dioxide is controlled at the polymerization temperature previously by a heating apparatus before feeding into the reaction vessel 3.

Pressure in the reaction vessel 3 is controlled at the polymerization pressure by the amount of carbon dioxide to be fed. On the other hand, temperature in the reaction vessel 3 is controlled at the polymerization temperature by the temperature controlling means 4 such as a heater. Control of pressure in the reaction vessel 3 and control of temperature in the reaction vessel 3 can be conducted simultaneously, alternatively, one of them can also be conducted before another control.

Pressure in polymerization reaction (polymerization pressure) can be appropriately determined depending on the properties of a supercritical fluid or subcritical fluid as a polymerization solvent, and a polymerization precursor, and an intended polymer, and the like. The polymerization pressure is preferably 0.65-fold or more of the critical pressure of a fluid, more preferably the critical pressure or more. When supercritical carbon dioxide or subcritical carbon dioxide is used, the polymerization pressure is preferably 5 MPa or more, more preferably 7 MPa or more, particularly preferably 7.4 MPa corresponding to the critical pressure or more. Within this range of the polymerization pressure, the polymerization reaction progresses more successfully, and a polymer of higher quality is obtained. The upper limit of the polymerization pressure is not particularly restricted, and from the standpoint of pressure resistance of the apparatus, and the like, it can be, usually, set at 150 MPa or less.

Temperature in the polymerization reaction (polymerization temperature) can be appropriately determined depending on the properties of a supercritical fluid or subcritical fluid as a polymerization solvent, and a polymerization precursor, and an intended polymer, and the like. The polymerization temperature is preferably 0.65-fold or more of the critical temperature of a fluid, more preferably the critical temperature or more. When supercritical carbon dioxide or subcritical carbon dioxide is used, the polymerization temperature is preferably 20° C. or more, more preferably 30° C. or more, particularly preferably 31° C. corresponding to the critical temperature or more. Within this range of the polymerization temperature, the polymerization reaction progresses more successfully, and a polymer of higher quality is obtained. The upper limit of the polymerization temperature is not particularly restricted, and usually, it can be set in the range of 250° C. or lower.

After setting given pressure and temperature in the reaction vessel 3, a photo-polymerization reaction is conducted by irradiating the inside of the reaction vessel 3 with an active energy ray through the active energy ray transmissible window 5 and the base material 8 while stirring the inside of the reaction vessel by the magnetic stirrer 9 and stirrer 10 to form a polymer membrane or a polymer containing a projection portion on the active energy ray exiting surface of the active energy ray transmission base material.

When the polymerization reaction apparatus shown in FIG. 1 is used, lids of the polymerization precursor storage parts 11 and 11' are opened sequentially at given moment during polymerization, and the polymerization precursor and/or addition components stored inside are fed to the reaction vessel 3. In this operation, the insides of the polymerization precursor storage parts 11, 11' were stirred by the magnetic stirrers 13, 13' and stirrers 12, 12'. By this, the composition and amount of the polymerization precursor and addition components present in the reaction vessel 3 are controlled during polymerization. By thus changing the composition of the polymerization precursor to be polymerized and addition components to be contained, the composition of the resulting polymer membrane or polymer containing a projection portion is varied along the vertical direction against the base material surface.

The polymerization precursor and/or addition components stored in the polymerization precursor storage parts 11 and 11' can be controlled at the polymerization temperature previously by a heating apparatus before feeding to the reaction vessel 3.

The active energy ray may be used for irradiation continuously or intermittently. It may also be permissible that, for example, irradiation with an active energy ray is stopped, the lids of the polymerization precursor storage parts 11 and 11' are opened, the polymerization precursor and/or addition components stored inside are fed to the reaction vessel 3, and the content in the reaction vessel 3 is stirred for a certain time until uniformity, then, irradiation with an active energy ray is conducted again.

When the polymerization reaction apparatus shown in FIG. 3 is used, the stop valve 19 is opened at given moment during polymerization, and the polymerization precursor and/or addition components stored in the polymerization precursor storage part 18 are fed to the reaction vessel 3 together with carbon dioxide fed from the carbon dioxide bomb 16. In this procedure, the temperature in the polymerization precursor storage part 18 is kept at given temperature, and the content in the polymerization precursor storage part 18 is stirred by a stirring means (magnetic stirrer and stirrer), to dissolve and/or disperse the polymerization precursor and/or addition components sufficiently uniformly in carbon dioxide. Further, the stop valve 24 is opened at given moment during polymerization, and the polymerization precursor and/or addition components stored in the polymerization precursor storage part 23 are fed to the reaction vessel 3 together with carbon dioxide fed from the carbon dioxide bomb 21. In this procedure, the temperature in the polymerization precursor storage part 23 is kept at given temperature, and the content in the polymerization precursor storage part 23 is stirred by a stirring means (magnetic stirrer and stirrer), to dissolve and/or disperse the polymerization precursor and/or addition components sufficiently uniformly in carbon dioxide. By this, the composition and amount of the polymerization precursor and addition components present in the reaction vessel 3 are controlled during polymerization. By thus changing the composition of the polymerization precursor to be polymerized and addition components to be contained, the composition of the resulting polymer membrane or polymer containing a projection portion is varied along the vertical direction against the base material surface.

Feeding of the polymerization precursor and/or addition components stored in the polymerization precursor storage part 18 to the reaction vessel 3 and feeding of the polymerization precursor and/or addition components stored in the polymerization precursor storage part 23 to the reaction vessel 3 may be conducted simultaneously or separately, according to demands.

Carbon dioxide may be fed to the polymerization precursor storage part 18 in feeding the polymerization precursor and/or addition components stored in the polymerization precursor storage part 18 to the reaction vessel 3, alternatively, carbon dioxide may be fed previously to the polymerization precursor storage part 18, and stored in the polymerization precursor storage part 18 for given time, then, fed to the reaction vessel 3. Further, carbon dioxide may be fed to the polymerization precursor storage part 23 in feeding the polymerization precursor and/or addition components stored in the polymerization precursor storage part 23 to the reaction vessel 3, alternatively, carbon dioxide may be fed previously to the polymerization precursor storage part 23, and stored in the polymerization precursor storage part 23 for given time, then, fed to the reaction vessel 3.

The polymerization precursor and/or addition components stored in the polymerization precursor storage part 18 and the polymerization precursor and/or addition components stored in the polymerization precursor storage part 23 can be controlled at the polymerization temperature previously by a heating apparatus before feeding to the reaction vessel 3 together with carbon dioxide, however, they can also be fed to the reaction vessel 3 without particular heating.

The feeding pressure of a fluid (carbon dioxide) fed to the reaction vessel 3 can be determined appropriately. The fluid may not be a supercritical fluid or subcritical fluid.

The concentration of the polymerization precursor and/or addition components in the fluid fed to the reaction vessel 3 can be determined appropriately.

Particularly, when the polymerization precursor and/or addition components stored in the polymerization precursor storage part 18 and the polymerization precursor and/or addition components stored in the polymerization precursor storage part 23 are heated before feeding to the reaction vessel 3, it is preferable that a line (piping) from the polymerization precursor storage part 18 to the reaction vessel 3 and a line (piping) from the polymerization precursor storage part 23 to the reaction vessel 3 are kept at given temperature, namely, at the temperature of the polymerization precursor and/or addition components to be fed.

It is not necessary that the polymerization precursors and/or addition components stored in the polymerization precursor storage parts 18, 23 are all fed to the reaction vessel 3, and they may be partially fed to the reaction vessel 3.

After feeding of the polymerization precursor and/or addition components stored in the polymerization precursor storage parts 18 to the reaction vessel 3 together with carbon dioxide, and/or, after feeding of the polymerization precursor and/or addition components stored in the polymerization precursor storage parts 23 to the reaction vessel 3 together with carbon dioxide, if necessary, control of pressure in the reaction vessel 3 and control of temperature in the reaction vessel 3 may be conducted.

The active energy ray may be used for irradiation continuously or intermittently. It may also be permissible that, for example, irradiation with an active energy ray is stopped, the polymerization precursor and/or addition components stored in the polymerization precursor storage part 18 or the polymerization precursor storage part 23 are fed to the reaction vessel 3, and the content in the reaction vessel 3 is stirred for a certain time until uniformity, then, irradiation with an active energy ray is conducted again.

In the polymerization reaction apparatuses shown in FIGS. 1 and 3, the thickness of a polymer membrane to be formed or the height of a projection portion of a polymer containing the projection portion can be controlled by controlling the dose of an active energy ray.

The dose (accumulated light quantity) of an active energy ray can be determined appropriately depending on the degree of polymerization of a desired polymer, the thickness of a polymer membrane to be formed or the height of a projection portion of a polymer containing the projection portion, and the like. The dose of an active energy ray can be, for example, from $0.5$ $mJ/cm^2$ to $100$ $J/cm^2$. The dose of an active energy ray can be controlled by irradiation time, lamp output and the like.

The intensity of an active energy ray can be determined appropriately, and for example, it can be from $0.01$ $mW/cm^2$ to $1$ tera $W/cm^2$ ($TW/cm^2$). The irradiation time of an active energy ray may be advantageously determined so as to obtain desired dose according to its intensity.

The polymerization pressure may be kept constant from initiation of polymerization until completion thereof, or may be varied during polymerization such as pressure increase or pressure decrease in association with progress of polymerization. The polymerization temperature may be kept constant from initiation of polymerization until completion thereof, or may be varied during polymerization.

The density and polarity of a supercritical fluid or subcritical fluid can be varied by pressure and temperature, and by this, the degree of dissolution of the polymerization precursor and addition components in a solvent (supercritical fluid or subcritical fluid) can be changed. For this, the composition of the resulting polymer can be controlled by controlling the polymerization pressure and polymerization temperature.

After completion of the polymerization reaction, carbon dioxide is discharged through the back pressure regulating valve, and the pressure in the reaction vessel 3 is lowered to about atmospheric pressure. Further, for removing unreacted polymerization precursors and the like to obtain a polymer of higher purity, the pressure in the reaction vessel 3 may be lowered below atmospheric pressure, for example, to vacuum of 133 Pa or less, then, returned to about atmospheric pressure. After returning temperature in the reaction vessel 3 to about normal temperature, the base material 8 on which a polymer membrane or a polymer containing a projection portion has been formed is removed out of the reaction vessel 3.

Further, after completion of the polymerization reaction, the polymer produced can be foamed by steeply decreasing pressure from high pressure under supercritical or subcritical condition, or steeply decreasing temperature and decreasing pressure from high temperature and high pressure conditions. A supercritical fluid or subcritical fluid shows strong and uniform permeation force into a polymer, therefore, by conducting such treatment, a uniform porous body can be formed.

In this procedure, the cooling speed of a polymer and the pressure decreasing speed of a polymer can be determined appropriately. By controlling the cooling speed of a polymer and the pressure decreasing speed of a polymer, the diameter of a pore can be controlled. When the cooling speed of a polymer and the pressure decreasing speed of a polymer are higher, the diameter of a pore tends to increase.

It may also be permissible that after polymerization, a polymer is left in a supercritical fluid or subcritical fluid for a given time according to demands, then, pressure is steeply decreased or temperature and pressure are steeply decreased to case foaming.

A polymer membrane or a polymer containing a projection portion formed on a base material removed from the reaction vessel 3 can also be post-cured by irradiation with an electromagnetic wave, irradiation with light or heating, or a combination thereof.

Carbon dioxide discharged from the reaction vessel 3 after completion of the polymerization reaction can be recovered and recycled.

A polymer membrane or a polymer containing a projection portion can be produced using the polymerization reaction apparatus of the present inventions as described above.

When the polymerization reaction apparatus shown in FIG. 1 is used, a polymerization precursor or, a polymerization precursor and addition components are charged in the reaction vessel 3 before initiation of polymerization, however, it may also be permissible that no material is charged in the reaction vessel 3 before initiation of polymerization and at initiation of polymerization, the lids of the polymerization precursor storage parts 11 and 11' are opened, and the polymerization precursor or, the polymerization precursor and addition components stored inside are fed to the reaction vessel 3.

When the polymerization precursor and/or addition components stored in the polymerization precursor storage part 11 and 11' are fed to the reaction vessel 3, irradiation with an active energy ray may be or may not be conducted. In other words, the polymerization precursor and/or addition components stored in the polymerization precursor storage parts 11 and 11' may be fed to the reaction vessel 3 while irradiating with an active energy ray, or irradiation with an active energy ray may be stopped and the polymerization precursor and/or addition components stored in the polymerization precursor storage parts 11 and 11' may be fed to the reaction vessel 3.

When the polymerization reaction apparatus shown in FIG. 3 is used, a polymerization precursor or, a polymerization precursor and addition components are charged in the reaction vessel 3 before initiation of polymerization, however, it may also be permissible that no material is charged in the reaction vessel 3 before initiation of polymerization and at initiation of polymerization, the stop valve 19 is opened, and the polymerization precursor or, the polymerization precursor and addition components stored in the polymerization precursor storage part 18 are fed to the reaction vessel 3.

Further, it may also be permissible that the polymerization precursor or, the polymerization precursor and addition components stored in the polymerization precursor storage part 18 are not fed to the reaction vessel 3, but, at initiation polymerization, the stop valve 24 is opened, and the polymerization precursor or, the polymerization precursor and addition components stored in the polymerization precursor storage part 23 are fed to the reaction vessel 3.

When the polymerization precursor and/or addition components stored in the polymerization precursor storage part 18 and 23 are fed to the reaction vessel 3, irradiation with an active energy ray may be or may not be conducted. In other words, the polymerization precursor and/or addition components stored in the polymerization precursor storage parts 18 and 23 may be fed to the reaction vessel 3 while irradiating with an active energy ray, or irradiation with an active energy ray may be stopped and the polymerization precursor and/or addition components stored in the polymerization precursor storage parts 18 and 23 may be fed to the reaction vessel 3.

In the present inventions, a supercritical fluid or subcritical fluid is used as a reaction field, however, other liquids or gases may be present.

For the purpose of enhancing the concentration of a polymerization precursor, addition components or photo-polymerization initiator in a supercritical fluid phase or subcritical fluid phase, an auxiliary solvent (entrainer) helping dissolution of solutes, namely, a polymerization precursor, addition components and photo-polymerization initiator may be used.

The entrainer can be appropriately selected depending on a supercritical fluid or subcritical fluid or a polymerization precursor used. When supercritical carbon dioxide or subcritical carbon dioxide is used, examples of the entrainer include methanol, ethanol, propane, butane, hexane, octane, acetic acid, ethyl acetate, acetone, water, acetonitrile and dichlorimethane. The entrainer may be used singly or in combination of two or more. The use amount of the entrainer can be appropriately determined.

Examples of the present inventions will be described below.

EXAMPLE 1

A polymer was produced using the polymerization reaction apparatus as shown in FIG. 1 except that the openable and closable lids of the polymerization precursor storage parts 11 and 11' are as shown in FIG. 2, a quartz pressure-resistant window 5 is provided at the bottom of a concave part provided on the inner wall of the reaction vessel, this window 5 is removable, and the window 5 itself is a base material. The volume of the pressure-resistant reaction vessel 3 of the polymerization reaction apparatus used is 60 $cm^3$, and the volumes of the polymerization precursor storage part 11 and the polymerization precursor storage part 11' are 5 $cm^3$ and 5 $cm^3$, respectively.

Into the polymerization precursor storage part 11, 0.872 g of a polyether bismaleimide acetic acid ester (manufactured by Dainippon Ink & Chemicals Inc., trade name: MIA-200) as a polymerization precursor was charged, and into the polymerization precursor storage part 11', 0.026 g of an organo-platinum complex [(1,5-cycloo-ctadiene)dimethylplatinum (II)] as an addition component was charged.

Next, carbon dioxide was introduced from the carbon dioxide bomb 1 into the reaction vessel 3 with the aid of bomb pressure (about 7 MPa) while stirring the content of the reaction vessel 3 by the magnetic stirrer 9 and the stirrer 10, the temperature was raised to 35° C., further, carbon dioxide was introduced by the pressurization pump 2 so that pressure in the reaction vessel 3 reached 30 MPa to give supercritical condition.

Next, the lid of the polymerization precursor storage part 11 was opened and the polyether bismaleimide acetic acid ester as a polymerization precursor stored inside was fed to the reaction vessel 3 while stirring the inside of the polymerization precursor storage part 11 by the magnetic stirrer 13 and the stirrer 12. The content was stirred at a pressure of 30 MPa and a temperature of 35° C. for 30 minutes, and using an extra high pressure mercury lamp equipped with quartz fiber as the light source 6, the inside of the reaction vessel 3 was irradiated with ultraviolet ray at a dose of 3 J/cm$^2$ via the quartz pressure-resistant window 5 from out of the reaction vessel 3. Irradiation conditions with ultraviolet ray in this operation included an irradiation intensity of 20 mW/cm$^2$ and an irradiation time of 150 seconds. The wavelength of ultraviolet ray used for irradiation was in the range from 254 to 436 nm.

Subsequently, the lid of the polymerization precursor storage part 11' was opened and the organoplatinum complex as an addition component stored inside was fed to the reaction vessel 3 while stirring the inside of the polymerization precursor cursor storage part 11' by the magnetic stirrer 13' and the stirrer 12'. The content was stirred at a pressure of 30 MPa and a temperature of 35° C. for 30 minutes, and again, the inside of the reaction vessel 3 was irradiated with ultraviolet ray at a dose of 3 J/cm$^2$ via the quartz pressure-resistant window 5 from out of the reaction vessel 3. Irradiation conditions with ultraviolet ray in this operation included an irradiation intensity of 20 mW/cm$^2$ and an irradiation time of 150 seconds. The wavelength of ultraviolet ray used for irradiation was in the range from 254 to 436 nm.

After irradiation with ultraviolet ray, the lid of the polymerization precursor storage part 11' was closed, the back pressure regulating valve 7 was allowed to act, and the content was stirred for 30 minutes while maintaining a pressure of 30 MPa and a temperature of 35° C., and the inside of the reaction vessel 3 was substituted with a polyether bismaleimide acetic acid ester as a polymerization precursor. Circulation was stopped, and the content was stirred further for 30 minutes at a pressure of 30 MPa and a temperature of 35° C., and again, the inside of the reaction vessel 3 was irradiated with ultraviolet ray at a dose of 3 J/cm$^2$ via the quartz pressure-resistant window 5 from out of the reaction vessel 3. Irradiation conditions with ultraviolet ray in this operation included an irradiation intensity of 20 mW/cm$^2$ and an irradiation time of 150 seconds. The wavelength of ultraviolet ray used for irradiation was in the range from 254 to 436 nm.

After irradiation with ultraviolet ray, carbon dioxide was gradually discharged out of the reaction vessel 3 over a period of 120 minutes, and pressure in the reaction vessel 3 was lowered down to atmospheric pressure.

As a result, a polymer containing a projection portion grown along the irradiation direction of ultraviolet ray, namely, along the vertical direction against the base material surface was formed on the quartz pressure-resistant window 5.

The section of the resulted polymer containing a projection portion was analyzed by XMA (X ray micro analyzer), to confirm layered concentration distribution of Pt.

EXAMPLE 2

A polymer was produced using the polymerization reaction apparatus as shown in FIG. 3 except that a quartz pressure-resistant window 5 is provided at the bottom of a concave part provided on the inner wall of the reaction vessel, this window 5 is removable, and the window 5 itself is a base material. The volume of the pressure-resistant reaction vessel 3 of the polymerization reaction apparatus used is 60 cm$^3$, and the volumes of the polymerization precursor storage part 18 and the polymerization precursor storage part 23 are 30 cm$^3$ and 30 cm$^3$, respectively.

Into the polymerization precursor storage part 18, 0.872 g of a polyether bismaleimide acetic acid ester (MIA-200) as a polymerization precursor was charged. Prior to the reaction, carbon dioxide was introduced from the carbon dioxide bomb 16 into the polymerization precursor storage part 18 with the aid of bomb pressure (about 7 MPa) while stirring the content of the polymerization precursor storage part 18 by a magnetic stirrer and a stirrer not shown, then, the temperature was raised to 35° C., further, carbon dioxide was introduced by the pressurization pump 17 so that pressure in the polymerization precursor storage part 18 reached 30.1 MPa to give supercritical condition.

Further, into the polymerization precursor storage part 23, 0.026 g of an organoplatinum complex [(1,5-cyclooctadiene) dimethylplatinum (II)] as an addition component was charged. Prior to the reaction, carbon dioxide was introduced from the carbon dioxide bomb 21 into the polymerization precursor storage part 23 with the aid of bomb pressure (about 7 MPa) while stirring the content of the polymerization precursor storage part 23 by a magnetic stirrer and a stirrer not shown, the temperature was raised to 35° C., further, carbon dioxide was introduced by the pressurization pump 22 so that pressure in the polymerization precursor storage part 23 reached 30.1 MPa to give supercritical condition.

Next, carbon dioxide was introduced from the carbon dioxide bomb 1 into the reaction vessel 3 with the aid of bomb pressure (about 7 MPa) while stirring the content of the reaction vessel 3 by the magnetic stirrer 9 and the stirrer 10, the temperature was raised to 35° C., further, carbon dioxide was introduced by the pressurization pump 2 so that pressure in the reaction vessel 3 reached 30 MPa to give supercritical condition.

Next, the stop valve 19 was opened and the polyether bismaleimide acetic acid ester as a polymerization precursor stored in the polymerization precursor storage part 18 was fed to the reaction vessel 3 while stirring the inside of the polymerization precursor storage part 18 by a magnetic stirrer and a stirrer not shown. The temperature in the polymerization precursor storage part 18 and the temperature of a line (piping) from the polymerization precursor storage part 18 to the reaction vessel 3 in feeding the polyether bismaleimide acetic acid ester were kept at 35° C. The content was stirred at a pressure of 30 MPa and a temperature of 35° C. for 30 minutes, and using an extra high pressure mercury lamp equipped with quartz fiber as the light source 6, the inside of the reaction vessel 3 was irradiated with ultraviolet ray at a dose of 3 J/cm$^2$ via the quartz pressure-resistant window 5 from out of the reaction vessel 3. Irradiation conditions with ultraviolet ray in this operation included an irradiation intensity of 20 mW/cm$^2$ and an irradiation time of 150 seconds. The wavelength of ultraviolet ray used for irradiation was in the range from 254 to 436 nm.

Subsequently, the stop valve 24 was opened and the organoplatinum complex as an addition component stored in the polymerization precursor storage part 23 was fed to the reaction vessel 3 while stirring the inside of the polymerization precursor storage part 23 by a magnetic stirrer and a stirrer not shown. The temperature in the polymerization precursor storage part 23 and the temperature of a line (piping) from the polymerization precursor storage part 23 to the reaction vessel 3 in feeding the organoplatinum complex were kept at 35° C. The content was stirred at a pressure of 30 MPa and a temperature of 35° C. for 30 minutes, and again, the inside of the reaction vessel 3 was irradiated with ultraviolet ray at a dose of 3 J/cm$^2$ via the quartz pressure-resistant window 5 from out of the reaction vessel 3. Irradiation conditions with ultraviolet ray in this operation included an irradiation intensity of 20 mW/cm$^2$ and an irradiation time of 150 seconds. The wavelength of ultraviolet ray used for irradiation was in the range from 254 to 436 nm.

After irradiation with ultraviolet ray, the stop valve 24 was closed, the back pressure regulating valve 7 was allowed to act, and the content was stirred for 30 minutes while maintaining a pressure of 30 MPa and a temperature of 35° C., and the inside of the reaction vessel 3 was substituted with a polyether bismaleimide acetic acid ester as a polymerization precursor. Circulation was stopped, and the content was stirred further for 30 minutes at a pressure of 30 MPa and a temperature of 35° C., and again, the inside of the reaction vessel 3 was irradiated with ultraviolet ray at a dose of 3 J/cm$^2$ via the quartz pressure-resistant window 5 from out of the reaction vessel 3. Irradiation conditions with ultraviolet ray in this operation included an irradiation intensity of 20 mW/cm$^2$ and an irradiation time of 150 seconds. The wavelength of ultraviolet ray used for irradiation was also in the range from 254 to 436 nm.

After irradiation with ultraviolet ray, carbon dioxide was gradually discharged out of the reaction vessel 3 over a period of 120 minutes, and pressure in the reaction vessel 3 was lowered down to atmospheric pressure.

As a result, a polymer containing a projection portion grown along the irradiation direction of ultraviolet ray, namely, along the vertical direction against the base material surface was formed on the quartz pressure-resistant window 5.

The section of the resulted polymer containing a projection portion was analyzed by XMA, to confirm layered concentration distribution of Pt.

According to the present inventions described above, the composition of a polymerization precursor to be polymerized and/or addition components to be contained in the polymer can be varied easily during polymerization. As a result, a polymer membrane or a polymer containing a projection portion in which the composition varies along the membrane thickness direction or along the vertical direction against the base material surface, for example, can be produced easily.

The invention claimed is:

1. A polymerization reaction apparatus used for producing a polymer by photo-polymerizing at least one polymerization precursor by irradiation with an
    active energy ray in a supercritical fluid or subcritical fluid, wherein
    the apparatus has
    a reaction vessel allowing photo-polymerization of said polymerization precursor and capable of maintaining a fluid under supercritical condition or under subcritical condition,
    an active energy ray irradiation means of irradiating the inside of said reaction vessel with said active energy ray,
    a fluid feeding means of feeding said fluid into said reaction vessel, and
    a fluid discharging means of discharging said fluid in said reaction vessel,
    the apparatus is equipped with at least one polymerization precursor storage part for accommodating a polymerization precursor to be polymerized and/or one or more addition components to be contained in the polymer, and said polymerization precursor storage part has a structure capable of feeding a polymerization precursor and/or addition components stored inside to a reaction field, wherein said polymerization precursor storage part is a concave part provided at the bottom of said reaction vessel and an openable and closable lid is provided on said concave part.

2. The polymerization reaction apparatus according to claim 1, further having a polymerization precursor storage part temperature controlling means of controlling the temperature of said polymerization precursor storage part.

3. The polymerization reaction apparatus according to claim 1, further having a polymerization precursor storage part stirring means of stirring the inside of said polymerization precursor storage part.

4. The polymerization reaction apparatus according to claim 1, having a base material disposing means for disposing an active energy ray transmission base material so that one side of said active energy ray transmission base material upon which an active energy ray is incident is not exposed to a supercritical fluid or subcritical fluid, and the opposite side of said active energy ray transmission material from which the active energy ray exits is exposed to a supercritical fluid or subcritical fluid.

5. The polymerization reaction apparatus according to claim 1, wherein said active energy ray irradiation means has
    a light source of an active energy ray provided outside of said reaction vessel, and
    a window part provided on part of said reaction vessel and capable of allowing transmission of an active energy ray radiated from said light source for irradiation into said reaction vessel.

6. The polymerization reaction apparatus according to claim 1, having a temperature controlling means of controlling the temperature in said reaction vessel.

7. The polymerization reaction apparatus according to claim 1, having a stirring means of stirring the inside of said reaction vessel.

8. The polymerization reaction apparatus according to claim 1, wherein said active energy ray is ultraviolet ray, visible ray or near-infrared ray.

9. A method of producing a polymer wherein at least one polymerization precursor is photo-polymerized by irradiation with an active energy ray in a supercritical fluid or subcritical fluid using the polymerization reaction apparatus according to claim 1 to produce a polymer.

10. A polymerization reaction apparatus used for producing a polymer by photo-polymerizing at least one polymerization precursor by irradiation with an active energy ray in a supercritical fluid or subcritical fluid, wherein
    the apparatus has
    a reaction vessel allowing photo-polymerization of said polymerization precursor and capable of maintaining a fluid under supercritical condition or under subcritical condition,
    an active energy ray irradiation means of irradiating the inside of said reaction vessel with said active energy ray,
    a fluid feeding means of feeding said fluid into said reaction vessel, and
    a fluid discharging means of discharging said fluid in said reaction vessel, and
    the apparatus has a plurality of polymerization precursor feeding means each having a structure capable of feeding a polymerization precursor to be polymerized and/or addition components to be contained in the polymer into said reaction vessel.

11. The polymerization reaction apparatus according to claim 10 wherein each of said polymerization precursor feeding means has
- a polymerization precursor storage part for accommodating a polymerization precursor to be polymerized and/or one or more addition components to be contained in the polymer,
- a polymerization precursor storage part fluid feeding means of feeding said fluid into said polymerization precursor storage part, and
- a polymerization precursor-fluid feeding means of feeding the polymerization precursor and/or addition components stored in said polymerization precursor storage part together with said fluid into said reaction vessel.

12. The polymerization reaction apparatus according to claim 11, further having a polymerization precursor storage part temperature controlling means of controlling the temperature of said polymerization precursor storage part.

13. The polymerization reaction apparatus according to claim 11, further having a polymerization precursor storage pan stirring means of stirring the inside of said polymerization precursor storage part.

14. A method of producing a polymer wherein at least one polymerization precursor is photo-polymerized by irradiation with an active energy ray in a supercritical fluid or subcritical fluid using the polymerization reaction apparatus according to claim 10 to produce a polymer.

15. The polymerization reaction apparatus according to claim 10,
- having a base material disposing means for disposing an active energy ray transmission base material so that one side of said active energy ray transmission base material upon which an active energy ray is incident is not exposed to a supercritical fluid or subcritical fluid, and the opposite side of said active energy ray transmission material from which the active energy ray exits is exposed to a supercritical fluid or subcritical fluid.

16. The polymerization reaction apparatus according to claim 10, wherein said active energy ray irradiation means has
- a light source of an active energy ray provided outside of said reaction vessel, and
- a window part provided on part of said reaction vessel and capable of allowing transmission of an active energy ray radiated from said light source for irradiation into said reaction vessel.

17. The polymerization reaction apparatus according to claim 10, having a temperature controlling means of controlling the temperature in said reaction vessel.

18. The polymerization reaction apparatus according to claim 10, having a stirring means of stirring the inside of said reaction vessel.

19. The polymerization reaction apparatus according to claim 10, wherein said active energy ray is ultraviolet ray, visible ray or near-infrared ray.

20. A polymerization reaction apparatus comprising:
- a reaction vessel having a reaction field for photo-polymerization of at least one polymerization precursor, said vessel being configured to maintain a fluid under supercritical condition or under subcritical condition;
- an active energy ray emitter for irradiating the reaction field of the reaction vessel with an active energy ray to photo-polymerize the polymerization precursor;
- a fluid feeder for feeding the fluid into the reaction vessel;
- a fluid discharger for discharging the fluid from the reaction vessel; and at least one polymerization precursor feeder configured to feed the polymerization precursor and/or one or more addition components to be contained, to the reaction field while photo-polymerization occurs, wherein the polymerization precursor feeder is a polymerization precursor reservoir with a hatch provided at a bottom of the vessel, said hatch separating the polymerization precursor reservoir from the reaction field and being configured to open and close during the photo-polymerization reaction.

21. The polymerization reaction apparatus according to claim 20, wherein the polymerization precursor feeder is a polymerization precursor reservoir with a feeding pipe connected to the vessel.

* * * * *